(12) United States Patent
Schwab

(10) Patent No.: US 6,593,445 B2
(45) Date of Patent: Jul. 15, 2003

(54) LOW COLOR POLY(BIPHENYL ETHER SULFONE) AND IMPROVED PROCESS FOR THE PREPARATION THEREOF

(75) Inventor: Thomas H. Schwab, Cumming, GA (US)

(73) Assignee: Solvay Advanced Polymers, LLC, Alpharetta, GA (US)

( * ) Notice: Subject to any disclaimer, the term of this patent is extended or adjusted under 35 U.S.C. 154(b) by 24 days.

(21) Appl. No.: 09/794,523

(22) Filed: Feb. 27, 2001

(65) Prior Publication Data

US 2002/0010307 A1 Jan. 24, 2002

Related U.S. Application Data

(60) Provisional application No. 60/186,864, filed on Mar. 3, 2000.

(51) Int. Cl.[7] .............................................. C08G 75/20
(52) U.S. Cl. ...................... 528/175; 520/171; 520/174; 525/328.5; 525/534; 525/535
(58) Field of Search ................................. 528/175, 171, 528/174, 391; 525/328.5, 534, 535

(56) References Cited

U.S. PATENT DOCUMENTS

| 4,307,222 A | 12/1981 | Schwab et al. |
| 4,636,557 A | 1/1987 | Deckers |
| 5,194,561 A | 3/1993 | Fischer et al. |

FOREIGN PATENT DOCUMENTS

| DE | 41 21 139 | 1/1993 |
| EP | 0 232 019 | 8/1987 |
| EP | 0 278 720 | 8/1988 |

OTHER PUBLICATIONS

Showa, Solvents in manufacture of polyoxyarylenes, 1984, Chem Abstract 101: 131341.*

* cited by examiner

*Primary Examiner*—Duc Troung
(74) *Attorney, Agent, or Firm*—McDermott, Will & Emery

(57) ABSTRACT

Improved carbonate method for producing poly(biphenyl ether sulfones) having a low color, the improvement being the use of small particle size anhydrous potassium carbonate. The resulting poly(biphenyl ether sulfones) are significantly improved in color.

25 Claims, No Drawings

LOW COLOR POLY(BIPHENYL ETHER SULFONE) AND IMPROVED PROCESS FOR THE PREPARATION THEREOF

This application claims the benefit of U.S. provisional application No. 60/186,864 filed Mar. 3, 2000.

BACKGROUND OF THE INVENTION

This invention relates to new poly(biphenyl ether sulfones). More particularly, this invention relates to new poly(biphenyl ether sulfones) having improved color. This invention is also directed to an improved process for manufacturing poly(biphenyl ether sulfones).

Aryl ether polymers and copolymers are well known; they can be synthesized from a variety of starting materials and they can be made with different melting temperatures and molecular weights. Poly(aryl ethers) may be crystalline and, at sufficiently high molecular weights, they are tough, i.e., they exhibit high values (>50 foot-pounds per cubic inch) in the tensile impact test (ASTM D-1822). They have potential for a wide variety of uses, and their favorable properties class them with the best of the engineering polymers. Poly(aryl ether sulfone) polymers have become widely accepted for use under stress at high temperatures, often in excess of 150° C.

One commercially important group of poly(aryl ether sulfones) comprises polymers containing a biphenyl group or moiety, typically derived from the monomer 4,4'-biphenol. Poly(aryl ether sulfones) that contain at least in part the 4,4'-biphenyl or 4,4'-biphenylene moiety are hereinafter referred to as poly(biphenyl ether sulfones).

Poly(aryl ether sulfones) having the following structure:

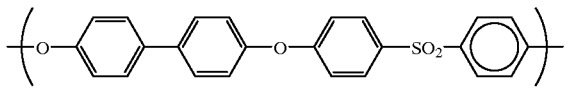

are available from BP Amoco Polymers, Inc. under the tradename of Radel R®. These resins possess excellent mechanical and other properties and are readily fabricated to provide a variety of useful articles such as molded goods, films, sheets and fibers. Poly(biphenyl ether sulfones) are also highly resistant to environmental stress cracking, and are thus particularly useful for manufacturing articles that are exposed to solvents or chemical agents at elevated temperatures and for extended times. For example, Radel R resins have found wide acceptance in the manufacture of articles for use where exposure to repeated and rigorous sterilization procedures is contemplated, such as medical trays and the like.

A very broad range of poly(aryl ether) polymers can be formed by the nucleophilic aromatic substitution (solution condensation polymerization) reaction of an activated aromatic dihalide and an aromatic diol in a substantially anhydrous dipolar aprotic solvent at elevated temperature. Ether bonds are formed via displacement of halogen by phenoxide anions with removal of halogen as alkali metal halide. Such polycondensations are usually performed in certain sulfoxide or sulfone solvents and the use of these dipolar aprotic solvents is an important feature of the process. The anhydrous dipolar aprotic solvents dissolve both the reactants and the polymers, and their use to enhance the rates of substitution reactions of this general type is well known.

One-step and two-step nucleophilic aromatic substitution processes for preparing poly(aryl ethers) are disclosed and well described in the art. In a one-step process, a double alkali metal salt of a dihydric phenol is reacted with a dihalobenzenoid compound in the presence of a dipolar aprotic solvent having a high boiling point such as, for example, dimethylformamide, N-methyl pyrolidinone, dimethyl sulfoxide, diphenyl sulfone or the like under substantially anhydrous conditions. In a two-step process, a dihydric phenol is first converted, in situ and in the presence of a solvent, to the alkali metal salt by reaction with an alkali metal or alkali metal compound. After removing water, a dihalobenzenoid compound is reacted with the double salt. The alkali metal salt of the dihydric phenol may be added in the solvent to the dihalobenzenoid compound either continuously, incrementally or all at once to achieve the polymerization reaction.

Several other variations of the process have been disclosed. An alkali metal carbonate may be employed with equimolar amounts of a dihydric phenol and a dihalobenzenoid compound at a ratio of at least one mole of an alkali metal carbonate per mole of dihydric phenol. The dihydric phenol reacts in situ with the alkali metal carbonate to form the alkali metal salt thereof, and the formed salt reacts with the dihalobenzoid compound to form the polyaryl ether in the usual fashion.

Mixtures of sodium carbonate or bicarbonate and a second alkali metal carbonate or bicarbonate have been disclosed for use in the preparation of poly(aryl ether sulfones) and poly(aryl ether ketones), i.e. poly(aryl ethers) containing $SO_2$ and/or CO linkages. The alkali metal of the second alkali metal carbonate or bicarbonate has a higher atomic number than that of sodium. The process provides polymer having a high molecular weight, as reflected by the reduced viscosity, that forms a tough, off-white film. Where fluorophenols or difluorobenzenoid compounds are used as the halogen-containing reactants, the amount of alkali metal carbonate required may be reduced.

Sodium and potassium salts, singly or in combination, are usually used in commercial practice. Although sodium salts are advantageous from an economic point of view, potassium salts are often chosen because the nucleophilic properties of the phenoxide anion are excellent. In a particular case where the dihalobenzenoid compound selected has low reactivity, a high molecular weight aromatic polyether cannot be obtained unless a potassium salt is used.

After completion of the polymerization reaction, additional process steps are needed to remove by-produced salts and to isolate and purify the resulting polymers. Recovery of dipolar aprotic solvents having high boiling points adds still further process steps.

Even though the monomers and solvents that are employed are highly purified, it is difficult to produce poly(arylether sulfones) that have low color, i.e. that are water white when formed and remain so when molded or otherwise melt processed. Side reactions, including solvent decomposition, hydrolysis of the dihalobenzenoid component and oxidation of a diphenol component or of phenolic endgroups, may occur during the heat-up portion of the process or later in the polymerization and lead to formation of highly colored contaminants. These, together with other contaminants produced by further thermal decomposition during subsequent melt fabrication operations, can result in products having an undesirable off-white, straw or even yellow color.

The poly(biphenyl ether sulfones) currently available to the trade, such as Radel R, have a yellow coloration. Although the effect on mechanical properties may be minimal, the cosmetic appearance of articles made from resins that are off-white or yellow may be unacceptable. Moreover, off-white resins are more difficult to pigment or color reproducibly to provide clear, bright colors such as are required by the packaging trade. Color, particularly of resins intended to be used in fabricating articles visible to the consumer, thus may be the determining factor in deciding the commercial acceptability of such goods.

Poly(biphenyl ether sulfones) having an improved, lighter color, preferably water-white, could find wider acceptance for many applications where color is a concern. Such lower color resins are clearly needed by the art and would thus represent a significant improvement over the resins currently available to the trade.

SUMMARY OF THE INVENTION

This invention is directed to an improved method for making low color poly(aryl ether sulfone) resins, and more particularly for making poly(biphenyl ether sulfone) resins, characterized by having a color factor of up to about 200, preferably up to about 170, determined on molded articles by spectrophotometric means. The improved process of this invention employs low particle size alkali metal carbonate, preferably anhydrous potassium carbonate, having an average particle size of less than about 100 microns, and may be conducted at a lower reaction temperature using reduced reaction times, compared with prior art processes.

The invention may be further described as directed to low color poly(biphenyl ether sulfones) characterized by having a color factor of up to about 200, preferably up to about 170, when molded.

The low color poly(biphenyl ether sulfones) prepared by the invented process have a superior appearance and are particularly desirable for use in applications where color, particularly a yellow color, is unacceptable such as, for example, in lenses, filters and other optical goods, for transparent covers or lids and in containers, glazing and other articles where transparency with low color is desirable or necessary. Lacking the yellow or beige cast of the prior art resins, the improved resins of this invention may also be more readily dyed or pigmented to achieve a desired coloration. The invented resins thus may also find use in filled and pigmented applications, particularly where white and brightly-colored goods are desired.

The invention has been described in related U.S. provisional application Ser. No. 60/186,864, filed Mar. 3, 2000, the entire disclosure of which is hereby incorporated herein by reference thereto.

DETAILED DESCRIPTION OF PREFERRED EMBODIMENTS

The invented low color poly(biphenyl ether sulfones) comprise the repeating structural unit:

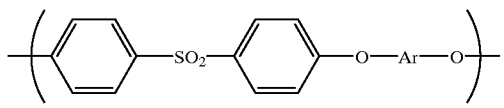

wherein at least about 50, preferably at least about 75 mole percent and more preferably at least 90 mole percent of the divalent Ar groups is p-biphenylene (4,4'-biphenylene) having the structure:

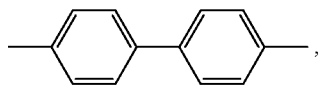

and wherein the remainder, if any, suitably comprises, but is not limited to, at least one member selected from p-phenylene, 4,4'-diphenyl sulfone and 2,2-diphenyl propane.

In general, polymers comprising high levels of the biphenyl or biphenylene moiety will have superior thermal properties and excellent chemical and environmental resistance. Thus, most preferred will be polymers wherein the Ar group is 100 mole percent p-biphenylene moiety, i.e. polymers wherein the aforesaid structural unit is:

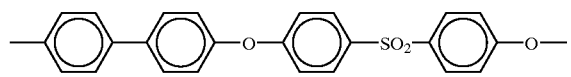

The poly(biphenyl ether sulfones) of this invention, when molded, will have a color factor of no more than 200, preferably no more than about 170, and will still more preferably lie in a range of from about 170 to about 80. Molded poly(biphenyl ether sulfones) with a color factor of from about 170 to about 100, preferably from about 150 to about 120, are readily produced by the improved process of this invention and these will be readily acceptable for use in most applications.

For the purposes of this invention, by color factor for the molded resin we mean a color value determined, preferably spectrophotometrically, using as a test specimen an article made from the resin such as, for example, an injection molded plaque, an extruded article or the like. The color factor may be conveniently calculated from the tristimulus values X, Y and Z that are obtained by integrating the transmission spectrophotometric curve.

Chromaticity coordinates x and y for a sample are determined as follows:

$$x = \frac{X}{X+Y+Z} \quad y = \frac{Y}{X+Y+Z}$$

Chromaticity coordinates define the as-measured color of the sample; color factor defines the color of the sample per unit of sample thickness. Color factor is determined by:

$$\text{Color factor} = \frac{((x+y) - 0.6264) \times 270}{\text{thickness}}$$

wherein "thickness" is the thickness of the specimen in inches. Where the specimen is a molded article having irregular shape, the thickness value will be the thickness of the portion of the test specimen presented to the spectrophotometer.

Color factor for the molded resin may also be measured if desired using other methods that will provide equivalent color factor values.

The poly(biphenyl ether sulfones) of this invention may also be characterized by the color of the as-produced resin wherein the transmission chromaticity values for a solution of the resin in a specified solvent at a standardized concentration are determined spectrophotometrically using a cuvette of known thickness. Measured at a concentration of 8 wt % in a solvent mixture of monochlorobenzene, sulfolane and N-methylpyrolidone, at a 3:2:2 ratio by weight, the invented poly(biphenyl ether sulfone) resins will have a solution color factor as-produced of up to about 50, preferably up to about 40. More particularly, the solution color factor will lie in the range of from about 10 to about 50, preferably from about 5 to about 40. Poly(biphenyl ether sulfones) having a solution color factor in the range of from about 20 to about 40 will also be highly desirable and acceptable for most applications. The solution color factor or batch color may be conveniently employed for quality control purposes in the production of poly(biphenyl ether sulfones).

The poly(biphenyl ether sulfones) of this invention may be prepared by the carbonate method. Generally described, the process is conducted by contacting substantially equimolar amounts of an aromatic bishydroxy monomer, preferably 4,4'-biphenol and at least one dihalodiarylsulfone, e.g., 4,4'-dichlorodiphenyl sulfone, 4,4'-difluorodiphenyl sulfone or the like, with from about 0.5 to about 1.1 mole, preferably from about 1.01 to about 1.1 mole, more preferably from about 1.05 to about 1.1 mole of an alkali metal carbonate, preferably potassium carbonate, per mole of hydroxyl group. Bishydroxybiphenyl analogs of biphenol, for example, compounds having structures such as

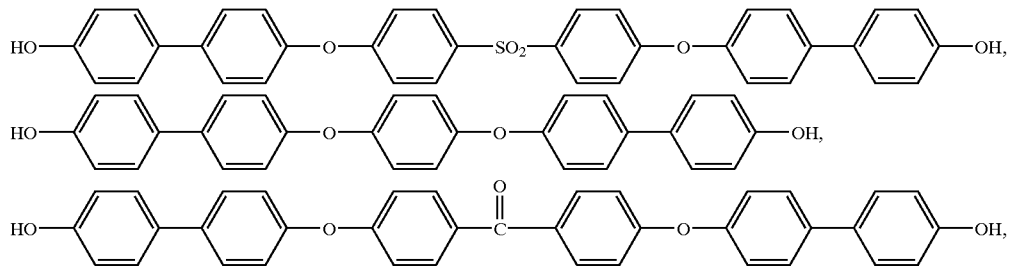

and the like may also be found suitable for use as the aromatic bishydroxy monomer component or as a comonomer with 4,4'-biphenol. Copolymers comprising up to 50 mole %, preferably no more than 25 mole %, still more preferably no more than 10 mole %, of one or more other bishydroxy aromatic compounds such as 4,4'-dihydroxydiphenyl sulfone, hydroquinone, bisphenol A or the like may be prepared if desired by replacing an equivalent portion of the biphenol component of the reaction mixture with the selected comonomer.

The components are dissolved or dispersed in a solvent mixture comprising a polar aprotic solvent together with a solvent which forms an azeotrope with water, whereby water formed as a byproduct during the polymerization may be removed by azeotropic distillation continuously throughout the polymerization.

The polar aprotic solvents employed are those generally known in the art and widely used for the manufacture of poly(aryl ether sulfones). For example, the sulfur-containing solvents known and generically described in the art as dialkyl sulfoxides and dialkylsulfones wherein the alkyl groups may contain from 1 to 8 carbon atoms, including cyclic alkylidene analogs thereof, are disclosed in the art for use in the manufacture of poly(aryl ether sulfones). Specifically, among the sulfur-containing solvents that may be suitable for the purposes of this invention are dimethylsulfoxide, dimethylsulfone, diphenylsulfone, diethylsulfoxide, diethylsulfone, diisopropylsulfone, tetrahydrothiophene-1,1-dioxide (commonly called tetramethylene sulfone or sulfolane) and tetrahydrothiophene-1-monoxide. Nitrogen-containing polar aprotic solvents, including dimethylacetamide, dimethylformamide and N-methyl-pyrrolidinone pyrrolidinone and the like have been disclosed in the art for use in these processes, and may also be found useful in the practice of this invention.

The solvent that forms an azeotrope with water will necessarily be selected to be inert with respect to the monomer components and polar aprotic solvent. Those disclosed and described in the art as suitable for use in such polymerization processes include aromatic hydrocarbons such as benzene, toluene, xylene, ethylbenzene, chlorobenzene and the like.

The azeotrope-forming solvent and polar aprotic solvent are typically employed in a weight ratio of from about 1:10 to about 1:1, preferably from about 1:5 to about 1:1.

Generally, after an initial heatup period, the temperature of the reaction mixture will be maintained in a range of from about 190° C. to about 250° C., preferably from about 200° to about 230° C., still more preferably from about 200° to about 225° C. for about 0.5 to 3 hours. Typically, if the reaction is conducted at atmospheric pressure, the boiling temperature of the solvent selected usually limits the temperature of the reaction.

The reaction may be conveniently carried out in an inert atmosphere, e.g., nitrogen, at atmospheric pressure, although higher or lower pressures may also be used.

It is essential that the reaction medium be maintained substantially anhydrous during the polycondensation. While amounts of water up to about one percent, preferably no more than 0.5 percent by weight, can be tolerated, and are somewhat beneficial when employed with fluorinated dihalobenzenoid compounds, amounts of water substantially greater than this are desirably avoided as the reaction of water with the halo compound leads to formation of phenolic species and low molecular weight products are obtained. Substantially anhydrous conditions may be conveniently maintained during the polymerization by removing water continuously from the reaction mass with the azeotrope-forming solvent as an azeotrope. In the preferred procedure, substantially all of the azeotrope-forming solvent, for example, chlorobenzene, will be removed by distillation as an azeotrope with the water formed in the reaction, leaving a solution comprising the poly(biphenyl ether sulfone) product dissolved in the polar aprotic solvent.

After the desired molecular weight has been attained, the polymer will preferably be endcapped to improve melt and oxidative stability. Generally, the endcapping is accomplished by adding a reactive aromatic halide or an aliphatic halide such as methyl chloride, benzyl chloride or the like to the polymerization mixture, converting any terminal hydroxyl groups into ether groups.

The poly(biphenyl ether sulfone) is subsequently recovered by methods well known and widely employed in the art such as, for example, coagulation, solvent evaporation and the like.

In the improved process of this invention, low color poly(biphenyl ether sulfones) are obtained by employing solid particulate alkali metal carbonate, preferably anhydrous potassium carbonate, having a fine particle size. Preferably, the average particle size of the alkali metal carbonate will be no more than about 100 microns, preferably no more than about 80 microns, and more preferably no more than about 60 microns. Alkali metal carbonate, particularly potassium carbonate, with an average particle size of no more than about 30 microns may be found to be highly effective in producing low color poly(biphenyl ether sulfones). The alkali metal carbonate employed in the practice of the improved process according to the invention may be further described as a particulate potassium carbonate having an average particle size lying in the range of from about 10 to about 100, preferably from about 10 to about 80, more preferably from about 10 to about 60 microns. Particulate potassium carbonate having an average particle size of from about 10 to about 30 may be found particularly effective in producing the low color poly(biphenyl ether sulfones). By average particle size we mean the weight average particle size; for the purposes of this invention, the average particle size of the alkali metal carbonate will be taken to be the equivalent of volume particle size, which may be conveniently determined using a particle analyzer analytical instrument.

The use of such low particle size carbonate provides poly(biphenyl ether sulfone) having substantially improved color as reflected by a lower color factor. The use of low particle size carbonate also provides a given molecular weight polymer using shorter overall polymerization reaction times and allows the use of lower reaction temperatures, together affording a significant improvement in energy consumption, reducing production costs.

The invention will be better understood by way of consideration of the following illustrative examples and comparison examples, which are provided by way of illustration and not in limitation thereof. In the examples, all parts and percentages are by weight unless otherwise specified.

EXAMPLES

Poly(biphenyl ether sulfones) of this invention may be conveniently prepared on a laboratory scale according to the following general procedure.

Polymerization Process

A 500 ml, 4-neck round bottom flask is equipped through its center neck with an overhead stirrer attached to a stainless steel paddle. A Claisen adapter fitted with a Dean-Stark trap and a water-cooled condenser is attached to a side neck, and a thermocouple thermometer attached to a temperature controller is inserted into the reactor through the Claisen adapter. A gas inlet tube and a stopper are placed in the other necks of the round bottom flask. The reactor is placed in an oil bath fitted with heaters connected to the temperature controller.

Biphenol, 26.07 pbw (parts by weight), 4,4'-dichlorodiphenyl sulfone (40.81 pbw), particulate anhydrous potassium carbonate (20.32 pbw), anhydrous sulfolane (130.81 pbw) and anhydrous chlorobenzene (43.60 pbw) are charged to the reactor.

The agitator is started to 300 rpm and the reactor is degassed by evacuating using a vacuum pump and then filling with nitrogen. The degassing operation is repeated two more times, and a steady stream of nitrogen through the reactor solution is started. Heating is initiated and the stirring speed is increased to 400 rpm, taking care not to splash the reaction solution above the heated zone of the reactor wall. As the temperature of the reaction mixture increases, chlorobenzene, along with the water formed as a reaction byproduct, distills as an azeotrope and is collected in the Dean-Stark trap; the collected distillate is not returned to the reaction flask. When the viscosity starts to increase, the agitator speed is increased to 500 rpm.

The predetermined reaction temperature, typically in the range 200–240° C., will generally be attained within about 50 to 60 minutes after initiating the heating cycle, and will be maintained for the time needed to reach the target molecular weight, typically 15 to 60 minutes. Still longer heating periods may be required for particular combinations of monomers and reactants and when other reactant stoichiometries are used. Those skilled in polycondensation process engineering will be familiar with the variety of methods widely employed in laboratory and plant operations for following the progress of a polymerization reaction. For example, the solution viscosity of the reaction mass increases as the polymerization proceeds, thereby increasing the load on the agitator motor. The progress of the polymerization reaction may thus be followed by monitoring the corresponding increase in load on the agitator motor circuit.

Upon reaching the desired molecular weight, the polymerization process is quenched by adding a mixture of sulfolane (12.55 pbw) and chlorobenzene (67.45 pbw) slowly from an addition funnel to cool the reaction mixture, typically to a temperature in the range of about 160–180° C. The polymer is endcapped by sparging the reactor with methyl chloride gas for 30–60 minutes. The total methyl chloride added is approximately 18 to 24 pbw; larger excesses of methyl chloride may be used if desired. Shortly (5–10 min.) after initiating the addition of methyl chloride, 4.4 pbw of an aqueous solution of potassium carbonate (ca. 9 wt. %) may be separately added. On completion of the methyl chloride addition, the heat source (oil bath) is removed.

The reactor solution is diluted by adding a mixture of 204.70 pbw chlorobenzene and 38.07 pbw sulfolane to reduce the viscosity of the reaction mass for filtering. The diluted polymer solution now comprises 56.06 pbw (theoretical yield) of the polymer dissolved in a mixture of chlorobenzene and sulfolane, 3:2 ratio by weight, at a concentration of approximately 11 wt %, together with suspended byproduct salts. After cooling to a temperature in the range of 100°–130° C., the solution is filtered to remove the byproduct salts. Filtration may be conveniently accomplished using a 2 micron filter medium in a pressure filter funnel under 10–20 psig nitrogen pressure.

After salt removal, the polymer is coagulated and recovered by slowly adding 100 pbw of the cooled solution to 500 pbw of a 70:30 mixture of methanol and water in a blender under high speed agitation. The precipitate is collected by filtration, returned to the blender, and given successive washings using 400 pbw methanol, 400 pbw deionized water and finally 400 pbw methanol. The washed precipitate is collected by filtration and dried in a vacuum oven (60 mm) at 120° C. with an air-bleed.

Monomer stoichiometry may vary from a 1:1 ratio as desired, for example, as an aid in controlling the final molecular weight of the product; in this example, a dichlorodiphenyl sulfone:biphenol mole ratio of 1:015 is used. The polymerization is conducted using a slight excess of potassium carbonate, 5% in this example, and is terminated and endcapped by reaction with methyl chloride to provide a more stable polymer. Those skilled in the art will recognize that the monomer mole ratio may also be adjusted as desired to achieve other levels of endgroups, and that molecular weight may be further controlled by extending or reducing the reaction hold time or by use of higher or lower reaction temperatures. Poly(biphenyl ether sulfones) having a reduced viscosity generally in the range of from 0.3 to 1.0 dl/g may be prepared in this manner.

Preparation of poly(biphenyl ether sulfones) on a pilot scale and in production equipment may be accomplished substantially by the polymerization process outlined for laboratory use. However, as will be understood by those skilled in the process engineering arts, heating times, agitation and polymer recovery methods will necessarily be varied to accommodate the requirements of the particular large scale process equipment selected for conducting the polymerization. In addition, vacuum flash devolatilization and melt devolatilization processes are well known in the art and are widely employed commercially for the purpose of recovering solid polymer from salt-free solutions economically, and these methods may be found particularly useful in manufacture of poly(biphenyl ether sulfones) on a large scale.

Color Factor Determinations

Molded Color Factor: A Macbeth Series 7000 Color-Eye Spectrophotometer and corresponding software program Optiview Version 1.2 Ka was used to determine color factor for a 2"×3" injection-molded plaque having a thickness ranging from 0.090 to 0.120 inches, determined to the nearest 0.001 inch. Injection molding may be conveniently accomplished with a conventional ram or screw injection molding machine, for example a Van Dorn, a Cincinnati Millacron or a Toyo injection molding machine, using a barrel temperature of about 730 to 740° F. and an injection pressure of about 50–70 tons.

The test plaque is placed in the transmission chamber of the spectrophotometer and the spectrophotometric curve is integrated to obtain tristimulus values X, Y, and Z. The parameters used are "Illuminate C", "2 degree observer", "spectral component included" and "transmission mode".

Chromaticity coordinates x and y are determined from the tristimulus value using the following equation, calculated by the software program.

$$x = \frac{X}{X+Y+Z} \quad y = \frac{Y}{X+Y+Z}$$

Color factor is determined by:

$$\text{Color factor} = \frac{((x+y) - 0.6264) \times 270}{\text{thickness}}$$

The correction factor, 0.6264, represents the (x+y) chromaticity coordinates for air as the reference standard; thickness is the thickness of the portion of the test specimen presented to the spectrophotometer.

Solution Color Factor: The chromaticity values for a solution of the resin at a concentration of 8 wt % in a suitable solvent may be determined spectrophotometrically in the same fashion as for molded plaques, using a cuvette of known thickness.

In the following examples, Solution Color Factor is determined using a BYK Gardner Spectrometer with a cell or cuvette having an 11 mm thickness.

Solution Color factor is determined by:

$$\text{Solution Color Factor} = \frac{((x+y) - 0.6275) \times 270}{\text{thickness} \times \text{concentration}},$$

wherein x and y are determined as before, thickness is the thickness of the cuvette in inches and concentration is the concentration of the solution in g/ml. For an 11 mm cuvette and an 8 wt % polymer solution, the denominator value will be 0.0346.

In the following examples, Solution Color is conveniently determined on the diluted polymer solution after filtration. The filtered reactor sample comprising polymer and a 60/40 mixture of monochlorobenzene (MCB) and sulfolane will be diluted with N-methyl pyrrolidinone (NMP) to a final concentration of 8 wt % for this analysis. The use of NMP is necessary inasmuch as solutions of poly(biphenyl ether sulfones) in MCB:sulfolane solvent mixtures solidify at room temperature. It will be further understood that Solution Color value comparisons may be valid only when made among solutions comprising the same solvent or solvent mixture.

Color Factor determinations summarized for the following examples are made on specimens and solutions held at room temperature unless otherwise noted.

Particle Size Determination

Particle size determinations for the anhydrous potassium carbonates employed for the polymerizations are made with a Microtrac Model 158704 particle analyzer, using a triple laser light source unless otherwise noted. The carrier liquid is a mixture of chlorobenzene and sulfolane (60:40 weight ratio). Particle size distributions determined by this method span particle sizes from 0.021 microns to 704.0 microns. The average particle size is reported as volume average particle size in microns. The volume average will be equal to the weight average for constant density materials, e.g. solid anhydrous potassium carbonate.

The average particle sizes for the anhydrous potassium carbonates employed in the following examples are reported below; the 50% and 90% values for particle size distribution are also provided to further characterize these carbonates.

In the following examples, reduced viscosity (RV) is determined at 25° C., using a solution of 0.2 g of polymer in 100 ml of N-methylpyrolidone (NMP).

Low Color Poly(biphenyl ether sulfone)

As-produced poly(biphenyl ether sulfones) having a Solution Color Factor as low as 5 may be obtained using small particle size potassium carbonate according to the invented process. Poly(biphenyl ether sulfones) prepared according to the invented process, when melt extruded, pelletized and injection molded, may have a Molded Color Factor of less than 100.

Anhydrous potassium carbonates employed in the following examples include:

EF80A: Granular anhydrous potassium carbonate having an average particle size of 30.7 microns, 90%≦53.6 microns, 50%≦22.8 microns, 10%≦9.4 microns; obtained as grade EF-80 anhydrous potassium carbonate, from Armand Products Company.

EF80B: Granular anhydrous potassium carbonate having an average particle size of 20.9 microns, 90%≦35.8 microns, 50%≦18.2 microns 10%≦7.6 microns; obtained as grade Extra Fine Grade anhydrous potassium carbonate, from Armand Products Company.

EF80C: Granular anhydrous potassium carbonate having an average particle size of 26.6 microns, 90%≦46.2 microns, 50%≦22.4 microns, 10%≦9.3 microns; obtained as grade EF-80 anhydrous potassium carbonate, from Armand Products Company.

EF50A: Granular anhydrous potassium carbonate having an average particle size of 152.1 microns, 90%≦414.6 microns, 50%≦67.8 microns, 10%≦13.6 microns; obtained as grade EF-50 anhydrous potassium carbonate, from Armand Products Company.

EF50B: Granular anhydrous potassium carbonate having an average particle size of 196.8 microns, 90%≦472.5 microns, 50%≦153.7 microns, 10%≦16.0 microns; obtained as grade EF-50 anhydrous potassium carbonate, from Armand Products Company.

Glass-Grade: Granular anhydrous potassium carbonate having a published typical average particle size in the range of 600–700 microns; obtained as grade Glass Grade anhydrous potassium carbonate, from Armand Products Company. Particle size determinations for two batches gave average particle sizes of 550 microns and 644 microns. When used in the following polymerizations, Glass Grade anhydrous potassium carbonate is ground, preferably in situ, thereby reducing the average particle size to a value in the range 150–350 microns.

0.5 mm: Granular anhydrous potassium carbonate, Glass Grade, ground using a Brinkman attrition mill, fitted with a 0.5 mm lab screen to provide particulate material having an average particle size of 34.5 microns, 90%≦68.8 microns, 50%≦23.1 microns, 10%≦8.5 microns.

1 mm: Granular anhydrous potassium carbonate, Glass Grade, ground using a Brinkman attrition mill, fitted with a 1 mm lab screen to provide particulate material having an average particle size of 61.0 microns, 90%≦168.3 microns, 50%≦26.4 microns, 10%≦9.9 microns.

2 mm: Granular anhydrous potassium carbonate, Glass Grade, ground using a Brinkman attrition mill, fitted with a 2 mm lab screen to provide particulate material having an average particle size of 80.5 microns, 90%≦214.8 microns, 50%≦36.3 microns, 10%≦10.4 microns, determined using a single laser light source.

Other grinding methods commonly employed in the process arts including impact milling and the like may also be found useful for the purposes of providing small particle size carbonates in the practice of this invention.

Poly(biphenyl ether sulfones) were prepared using different particle size anhydrous potassium carbonates, substantially according to the general polymerization process outlined above. Reduced viscosity and Solution Color Factor for the polymers produced in the various runs are summarized in Table 1, below.

TABLE 1

Poly(biphenyl ether sulfone) Polymerizations

| Ex. No. | Type | $K_2CO_3$[1] Size μm | excess % | Temp. °C. | Time min. | RV dl/g | Solution Color Factor |
|---|---|---|---|---|---|---|---|
| C1 | EF50A | 152.1 | 7 | 220 | 120 | 0.65 | 33 |
| C2 | EF50A | 152.1 | 5 | 220 | 170 | 0.60 | 51 |
| 1 | 2 mm | 80.5 | 7 | 220 | 160 | 0.57 | 40 |
| 2 | 2 mm | 80.5 | 7 | 220 | 108 | 0.64 | 19 |
| 3 | 1 mm | 61.0 | 7 | 220 | 123 | 0.62 | 21 |
| 4 | 0.5 mm | 34.5 | 7 | 220 | 29 | 0.64 | 29 |
| 5 | EF80A | 30.7 | 7 | 220 | 15 | 0.81 | 29 |
| 6 | EF80A | 30.7 | 5 | 220 | 24 | 0.64 | 15 |
| 7 | EF80A | 30.7 | 5 | 210 | 35 | 0.64 | 14 |
| 8 | EF80A | 30.7 | 5 | 200 | 80 | 0.62 | 17 |
| 9 | EF80A | 30.7 | 3 | 220 | 68 | 0.62 | 23 |
| 10 | EF80B | 20.9 | 7 | 220 | 45 | 0.71 | 36 |
| 11 | EF80B | 20.9 | 7 | 220 | 16 | 0.58 | 23 |
| 12 | EF80B | 20.9 | 5 | 220 | 15 | 0.75 | 26 |
| 13 | EF80B | 20.9 | 5 | 220 | 14 | 0.64 | 12 |
| 14 | EF80B | 20.9 | 3 | 220 | 25 | 0.62 | 16 |

Notes:
[1]$K_2CO_3$ is anhydrous potassium carbonate; size is average particle size; excess is % stoichiometric excess employed, see text. For details of temp (erature), (reaction) time, RV (reduced viscosity), and Solution Color Factor, see text.

It will be apparent from a comparison of the Color Factor values for the poly(biphenyl ether sulfones) set forth in Table 1 that using small particle size anhydrous potassium carbonate improves the color of the polymer, i.e. lowers the Solution Color Factor. Compare Example C1 with Examples 1–5, and Example C2 with Examples 6–9. Carbonate stoichiometry, as well as reaction time and temperature, also affect resin color, as shown by comparing Example C1 with C2, and Examples 6–8, Example C2 with Examples 6–9, and Example 10 with Examples 11–14. However, for a given set of reaction parameters, reducing the carbonate particle size will be seen to afford substantial improvement in color, particularly when the average particle size is less than about 80.

Larger scale polymerization runs were also undertaken. Solution Color Factor and Molded Color Factor values for the polymers produced in the various large scale runs are summarized below.

TABLE 2

Large Scale Poly(biphenyl ether sulfone) Polymerizations

| Ex. No. | Type | $K_2CO_3$[1] Size μm | excess % | No. of Runs[2] | Solution Color Factor Ave. | High | Low |
|---|---|---|---|---|---|---|---|
| 15 | EF-80C | 26.6 | 5 | 3 | 35 | 37 | 33 |
| 16 | EF-80 | 21–34 | 5 | 45 | 37 | 52 | 6 |
| C3 | Glass-Grade | 150–350 | 5 | 24 | 70 | 100 | 48 |

Notes:
[1]$K_2CO_3$ is anhydrous potassium carbonate; size is average particle size range for the carbonates used over the series of runs averaged; excess is % stoichiometric excess employed, see text.
[2]No. of Runs is the number of batch runs averaged, see text. Reaction temperatures for Example 15 were 205°–210°C.; for Example 16, 214°–216° C.; for C3, 227° C.

It will be apparent from a comparison of the average of the Solution Color Factor values for the group of three polymer runs, Example 15, and for the group of 45 runs, Example 16, with the average color for the group of 24 runs made with large particle size potassium carbonate, Comparative Example C3, that the use of small particle size carbonate provides a substantial improvement in color. Note further that resins having very low Solution Color Factor values, as low as 6, may be provided in the invented process by using low particle size anhydrous potassium carbonate.

Thus, it will be seen from the data presented in Tables 1 and 2 that the use of solid anhydrous potassium carbonate having an average particle size less than 100 microns, preferably less than about 80 microns, still more preferably less than about 30 microns, in the invented process will provide resins having Solution Color Factor values, on average, that do not exceed 50, more preferably 40, and may provide resins with substantially lower Solution Color Factor values, as low as 10, preferably as low as 5.

Pelletized resins produced in a series of 108 large scale polymerization runs made using EF-80 were injection molded. The average of the Molded Color Factor values for the molded plaques is summarized in the following Table 3, together with the high and low values. Also presented are the average color values and high and low values for molded resins from a series of 17 runs, made on consecutive days using the same lot of monomers and carbonate and the same reaction conditions throughout.

For comparison, 40 pelletized resins produced in a series of large scale polymerization runs using Glass Grade anhydrous potassium carbonate were injection molded. The average of the Molded Color Factor values for the 40 molded plaques, together with the high and low values, is also summarized in the following Table 3.

TABLE 3

Color of Molded Poly(biphenyl ether sulfones)

| Ex. No. | $K_2CO_3$[1] | | | | Molded | | |
| | Type | Size $\mu m$ | excess % | No. of Runs[2] | Color Factor | | |
| | | | | | Ave. | High | Low |
|---|---|---|---|---|---|---|---|
| 17 | EF-80 | 21–34 | 5 | 108 | 174 | 199 | 131 |
| 18 | EF-80 | 21–34 | 5 | 17 | 155 | 182 | 131 |
| C4 | Glass-Grade | 150–350 | 5 | 40 | 238 | 296 | 210 |

Notes:
[1]$K_2CO_3$ is anhydrous potassium carbonate; size is average particle size range for the carbonates used over the series of runs averaged; excess is % stoichiometric excess employed, see text.
[2]No. of Runs is the number of batch runs averaged, see text. Reaction temperatures for Examples 17 and 18 were 214°–216° C.; for C4, 227° C.

It will be seen from a comparison of the average of the Molded Color Factor values for these groups that the color of molded poly(biphenyl ether sulfones) is significantly improved (lower Molded Color Factor) when the resin is produced using small particle size anhydrous potassium carbonate according to the invention (Examples 17 and 18) compared with resins prepared using large particle size carbonates (Comparative Example C4).

Generally, resins having Molded Color Factor values that, on average, do not exceed 200, more preferably 160, are readily produced by employing solid anhydrous potassium carbonate having an average particle size less than 100 microns, preferably less than about 80 microns, still more preferably less than about 30 microns in the invented process, and resins having Molded Color Factor values as low as 120, preferably as low as 100, still more preferably as low as 80, may be provided by the process.

Further Comparisons

The process of this invention is thus seen to be effective in providing low color poly(biphenyl ether sulfones). However, when low particle size anhydrous potassium carbonate is used in the invented process for the polymerization of 4,4'dihydroxydiphenyl sulfone, optionally including up to 25 mole % hydroquinone, with 4,4'-dihalodiphenyl sulfone, little color improvement is seen. Indeed, the Solution Color Factor for polymers of 4,4'dihydroxydiphenyl sulfone and hydroquinone (3:1 mole ratio) with 4,4'-dihalodiphenyl sulfone prepared with small particle anhydrous potassium carbonate will be significantly higher than when prepared with large particle size anhydrous potassium carbonate.

In the following Comparative Examples, laboratory scale polymerizations were carried out substantially following the general process employed for poly(biphenyl ether sulfone) as outlined. The process parameters, resulting resin reduced viscosities (RV) and Solution Color Factor values are summarized in the following Table 4.

TABLE 4

Poly(aryl ether sulfone) Polymerizations

| Ex. No. | $K_2CO_3$[1] | | | Temp. ° C. | Time min. | RV dl/g | Solution Color Factor |
| | Type | Size $\mu m$ | excess % | | | | |
|---|---|---|---|---|---|---|---|
| C5  | EF50B  | 196.8 | 6 | 235 | 70  | 0.60 | 97   |
| C6  | 2 mm   | 80.5  | 6 | 235 | 60  | 0.61 | 85   |
| C7  | 1 mm   | 61.0  | 6 | 235 | 120 | 0.52 | 93   |
| C8  | 0.5 mm | 34.5  | 6 | 235 | 49  | 0.64 | 286  |
| C9  | EF80A  | 30.7  | 6 | 235 | 39  | 0.56 | 416  |
| C10 | EF80C  | 26.6  | 6 | 235 | 43  | 0.55 | 319  |
| C11 | EF80B  | 20.9  | 6 | 235 | 55  | 0.55 | 1167 |
| C12 | EF80B  | 20.9  | 6 | 235 | 49  | 0.67 | 806  |
| C13 | EF80B  | 20.9  | 6 | 220 | 75  | 0.57 | 742  |
| C14 | EF50B  | 196.8 | 4 | 235 | 85  | 0.55 | 59   |
| C15 | EF50B  | 196.8 | 4 | 225 | 125 | 0.56 | 61   |
| C16 | EF50A  | 152.1 | 4 | 235 | 90  | 0.62 | 83   |
| C17 | EF50A  | 152.1 | 4 | 220 | 126 | 0.54 | 86   |
| C18 | EF80C  | 26.6  | 4 | 235 | 43  | 0.58 | 215  |
| C19 | EF80C  | 26.6  | 4 | 235 | 50  | 0.54 | 145  |

Notes:
[1]$K_2CO_3$ is anhydrous potassium carbonate; size is average particle size; excess is % stoichiometric excess employed, see text. For these polymers, color is determined at 10 wt % solution in 60/40 MCB/sulfolane. For details of temp(erature), (reaction) time, RV (reduced viscosity) and Solution Color Factor, see text.

It will be seen from a comparison of the Solution Color Factor values for the Comparative Examples set forth in Table 4 that for poly(arylether sulfones) polymerized using comparable reaction parameters, increasing the particle size provides polymer with improved color, i.e. lower Solution Color Factor. Compare C5–C7 with C8–C12. Although solution color may be improved by reducing the reaction temperature, and by varying the level of excess potassium carbonate, it will be seen that poor color in poly(aryl ether sulfones) is primarily the result of the use of low particle size anhydrous potassium carbonate in the polymerization process. Polycondensation of dihydroxydiaryl sulfones and dihalodiaryl sulfones thus will preferably be carried out using solid anhydrous potassium carbonate having a particle size greater than about 60 microns, preferably greater than 100 microns.

The effect of anhydrous potassium carbonate particle size on the color of poly(aryl ether sulfones) will thus be seen to be opposite of that found for the preparation of poly (biphenyl ether sulfones) according to the invention. The improvement in the color of poly(biphenyl ether sulfones) that results by using small particle size anhydrous potassium carbonate is thus neither obvious nor readily predicted, and is therefore surprising.

While not wishing to be bound by a particular theory or explanation, it appears that polymerizations based on the condensation of a dihydroxydiphenyl sulfone monomer require increased reaction times and temperatures, due in part to a low observed reactivity of the corresponding alkali metal salt. The increased reaction temperature in turn appears to result in decomposition and color formation.

The invention will thus be seen to be directed to an improved process for the preparation of low color poly (biphenyl ether sulfones) wherein a small particle size solid anhydrous potassium carbonate is employed. Generally, solid anhydrous potassium carbonate having a particle size of up to about 100 microns, preferably in the range of from about 10 to about 80 microns, more preferably from about 10 to about 60 microns, will be found to be effective for producing low color poly(biphenyl ether sulfones) according to the invention.

The invented process may be more particularly described as an improved solution polycondensation process for the preparation of low color poly(biphenyl ether sulfones). The invented process comprises the steps of contacting substantially equimolar amounts of 4,4'-biphenol and at least one dihalodiarylsulfone with from about 0.5 to about 1.1 mole, preferably from about 1.01 to about 1.1 mole, more preferably from about 1.05 to about 1.1 mole of an alkali metal carbonate, dissolved or dispersed in a solvent mixture comprising a polar aprotic solvent together with a solvent which forms an azeotrope with water, the improvement being the use of a low particle size particulate anhydrous potassium carbonate as the alkali metal carbonate. Said potassium carbonate may be more specifically described as a solid particulate anhydrous potassium carbonate having an average particle size no greater than about 100 microns, preferably up to 80 microns, more preferably up to about 60 microns. Anhydrous potassium carbonate having an average particle size in the range of from about 10 to about 60 microns, more preferably from about 10 to about 30 microns, will be found particularly useful in the practice of this invention. The invented process will be understood to further include the steps of heating the reaction mixture while removing water continuously by azeotropic distillation, maintaining the reaction mixture at an elevated temperature generally in the range of from about 200° to about 300° C., preferably up to about 240° C., until a molecular weight as characterized by reduced viscosity in the range of from about 0.3 to about 1.1 dl/g is achieved, quenching the reaction and endcapping the polymer, removing byproduct salts and recovering the polymer from solution.

Alternatively, the anhydrous potassium carbonate most preferred for the purposes of this invention may be described as a particulate solid anhydrous potassium carbonate having an average particle size of from about 10 to about 40 microns wherein at least 80% of the particles lie within a range of from about 100 microns to about 10 microns.

The process of this invention provides poly(biphenyl ether sulfones) that are significantly improved in color, and the invention may therefore also be described as directed to improved poly(biphenyl ether sulfones) having low color, more particularly as having a Solution Color Factor, determined at a concentration of 8 wt % in a mixture of MCB, sulfolane, and NMP in a 3:2:2 ratio by weight, of up to about 50, preferably up to about 40. The preferred poly(biphenyl ether sulfones) according to the invention will have a Solution Color Factor in the range of from about 10 to about 40, more preferably from about 5 to about 40.

Poly(biphenyl ether sulfones) according to the invention will also have improved color after molding. Molded poly (biphenyl ether sulfone) resins according to the invention will have a color factor, more particularly a Molded Color Factor, of up to about 200, and preferably up to about 160. The improved poly(biphenyl ether sulfones), when molded, may have a Molded Color Factor as low as 80, and may be more particularly described and characterized as poly (biphenyl ether sulfones) having a Molded Color Factor in the range of from about 120 to about 200, preferably from about 100 to about 160, and still more preferably from about 80 to about 160.

While the invention has been illustrated by means of specific embodiments, these are not intended to be limiting. Further additions and modifications will be readily apparent to those skilled in the art, and such modifications and additions, and processes, compositions and articles embodying them, are contemplated to lie within the scope of the invention as defined and set forth in the following claims.

I claim:

1. A poly(biphenyl ether sulfone) having a Molded Color Factor of less than 200 comprising the structural unit;

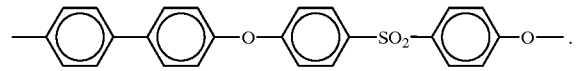

2. The poly(biphenyl ether sulfone) of claim 1 having a Molded Color Factor value of up to about 160.

3. The poly(biphenyl ether sulfone) of claim 1 having a Molded Color Factor value of up to about 120.

4. The poly(biphenyl ether sulfone) of claim 1 having a Molded Color Factor value in the range of from about 80 to about 160.

5. A poly(biphenyl ether sulfone) according to claim 1 comprising at least about 75 mole percent of said structural unit.

6. A poly(biphenyl ether sulfone) according to claim 1 consisting of said structural unit.

7. A poly(biphenyl ether sulfone) comprising the following structural unit:

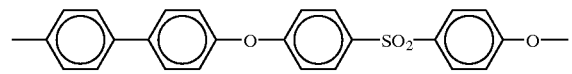

having a Solution Color Factor no greater than about 50, determined at 8 wt % in a solvent mixture of monochlorobenzene, sulfolane and N-methylpyrolidone, at a 3:2:2 ratio by weight.

8. The poly(biphenyl ether sulfone) of claim 7 wherein the Solution Color Factor lies in a range of from about 10 to about 40.

9. The poly(biphenyl ether sulfone) of claim 7 wherein the Solution Color Factor lies in a range of from about 5 to about 40.

10. In a method for preparing a poly(biphenyl ether sulfone) comprising contacting in a polymerization reaction mixture substantially equimolar amounts of at least one bishydroxybiphenyl compound and at least one dihalodiaryl sulfone with an alkali metal carbonate in the presence of a solvent comprising a polar aprotic solvent to form a poly (biphenyl ether sulfone), the improvement wherein the alkali metal carbonate is a solid particulate anhydrous potassium carbonate having an average particle size of up to about 100 microns.

11. The method of claim 10 wherein potassium carbonate has an average particle size of up to about 80 microns.

12. The method of claim 10 wherein potassium carbonate has an average particle size of up to about 60 microns.

13. The method of claim 10 wherein potassium carbonate has an average particle size in the range of from about 10 to about 60 microns.

14. The method of claim 10 wherein potassium carbonate has an average particle size in the range of from about 20 to about 30 microns.

15. The method of claim 10 wherein potassium carbonate has an average particle size in the range of from about 10 to about 40 microns and wherein at least 80% of said particles lie within a range of from about 100 microns to about 10 microns.

16. A poly(biphenyl ether sulfone) prepared according to the method of claim 10.

17. A poly(biphenyl ether sulfone) prepared according to the method of claim 10, said poly(biphenyl ether sulfone) having a Molded Color Factor value in the range of from about 80 to about 160.

18. A poly(biphenyl ether sulfone) prepared according to the method of claim 10, said poly(biphenyl ether sulfone) having a Solution Color Factor value in the range of from about 5 to about 40, determined at 8 wt % in a solvent mixture of monochlorobenzene, sulfolane and N-methylpyrolidone, at a 3:2:2 ratio by weight.

19. Molded articles comprising a poly(biphenyl ether sulfone) having a Color Factor of up to about 200.

20. The molded articles of claim 19 wherein said poly(biphenyl ether sulfone) has a Color Factor of up to about 160.

21. The molded articles of claim 19 wherein said poly(biphenyl ether sulfone) has a Color Factor in the range of from about 80 to about 160.

22. The molded articles of claim 19 wherein said articles are injection molded.

23. A molded article comprising a poly(biphenyl ether sulfone) prepared according to the method of claim 10.

24. Extruded articles comprising the poly(biphenyl ether sulfone) of claim 1.

25. Extruded articles comprising a poly(biphenyl ether sulfone) prepared according to the method of claim 10.

* * * * *